(No Model.)
F. H. BRIGGS.
MEANS FOR INDICATING DISCHARGE FROM OR INTO HOPPERS.
No. 468,970. Patented Feb. 16, 1892.
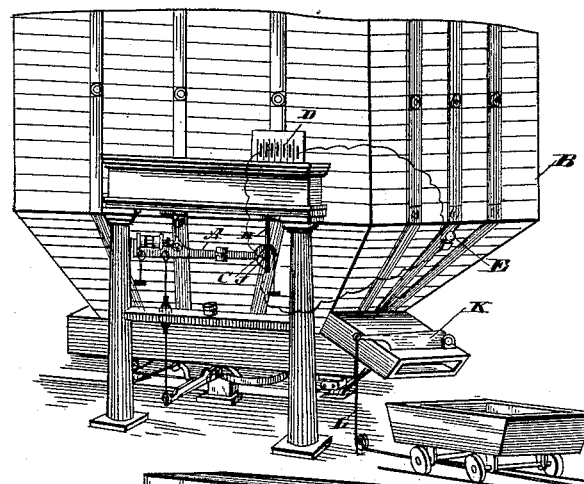
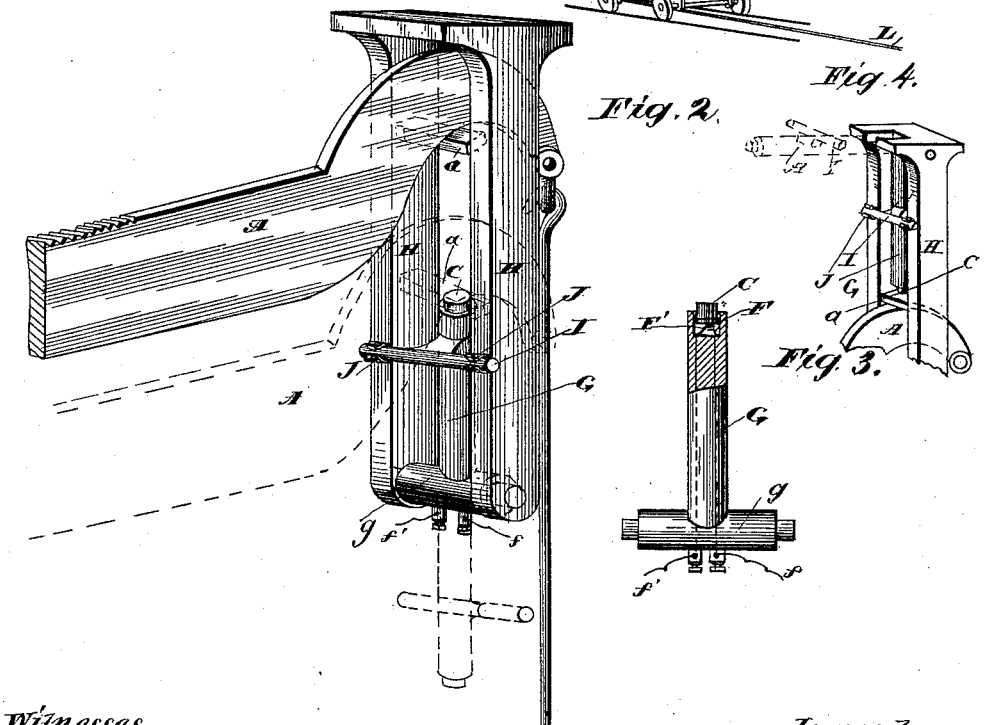
Witnesses
Alonzo M. Snyder
Robert P. Briggs
Inventor
Frank H. Briggs
by Wm. M. Monroe
Attorney

UNITED STATES PATENT OFFICE.

FRANK H. BRIGGS, OF CLEVELAND, OHIO.

MEANS FOR INDICATING DISCHARGE FROM OR INTO HOPPERS.

SPECIFICATION forming part of Letters Patent No. 468,970, dated February 16, 1892.

Application filed April 29, 1891. Serial No. 391,011. (No model.)

*To all whom it may concern:*

Be it known that I, FRANK H. BRIGGS, a citizen of the United States, and a resident of Cleveland, in the county of Cuyahoga, State of Ohio, have invented a certain new and useful Means for Indicating the Discharge from a Hopper, of which I hereby declare the following to be a full, clear, and exact description of the invention, such as will enable others skilled in the art to which it appertains to make and use the same.

My invention relates to the method of and means for indicating the amount discharged from or into a receptacle in connection with the weight of the load as exhibited by the beam of a weighing-scale in the manner further described herein.

The objects of the invention are to notify the operator tending the discharge from or into the receptacle, even though at a distance from the scale, when the required amount has been obtained, so that he can cut off the supply at the proper time or to cut itself off automatically.

My invention consists in utilizing the scale-beam at the proper moment to complete an electric circuit, and it is illustrated in the accompanying drawings, further described herein, and specifically pointed out in the claims.

In the drawings, Figure 1 is a perspective view of my invention as applied to a scale-beam adjacent to a funnel-shaped hopper, whose weight, including contents, it indicates. Fig. 2 is a detail in perspective of an electric switch operated by the beam of the scale. Fig. 3 is a detail. Fig. 4 is a modified form adapted to register the upper stroke of the scale-beam.

A in the drawings represents the beam of a heavy scale connected, as shown in Fig. 1, with a loaded hopper B in such a manner as to indicate its weight, any common construction being employed for this purpose.

C is a push-button with light spring-electrodes F F', supported suitably in such a manner as to receive the downstroke of the beam and complete the circuit between the electric battery D and an alarm E, placed in any convenient position for the operator's use.

In Figs. 2 and 3 are shown the detail connections, f and f' being the terminals of the circuit contained in the insulated rod G, pivoted at its lower end by cross-bar g in the guides H, so that when not in use it can be turned down, as shown in dotted lines, to allow free operation of the scale-beam.

f and f' are binding-posts upon the rod G.

J J are spring-catches to secure the cross-bar to the guides. An extension a upon the curved portion of the scale-beam A insures its striking the button C.

K represents a slide to cut off the chute, and L a cord to operate this from a distance.

Many times in arranging a receptacle and weighing-scales for the same the receptacle is too far distant from the scale or in too inaccessible a position for the operator to follow its rulings, and often he wastes material, since he cannot tell when the exact amount required has been delivered. The scales are sometimes above and sometimes below the discharge-opening. This difficulty is avoided, therefore, in the following manner: When it is desired to draw any known amount from the receptacle, the weight of the whole is first taken, and then the indicator-weights are placed at the difference between the whole weight and the quantity to be taken out, so that when the desired quantity has escaped the scale-beam will fall of its own accord to a level position. For example, a loaded receptacle is weighed and found to contain five hundred pounds and it is desired to weigh out one hundred pounds. The indicator weights are therefore placed at four hundred pounds, and the beam must fall when this weight is reached and must strike the button, which completes the circuit. When this has been accomplished, the apparatus shown will operate the signal and the operator will know just when to shut off the supply. If it is inconvenient or too expensive to have an operator to shut off or turn on the chute at the proper time, it could be done automatically by electricity.

When it is desired to discharge any known amount into the hopper or receptacle, the indicator-weights are placed at the whole weight desired, so that when the desired quantity has been received into the receptacle the scale-beam will rise of its own accord to a level position, striking the device which has been placed above the curved part of the beam, accomplishing the same results as on its downward stroke.

I do not claim the exact details as herein described or such improvements as any mechanic might make in construction; but What I do claim as new, and desire to secure by Letters Patent, is—

1. In mechanism for indicating electrically the weight of a load from the movements of a scale-beam, a rod G, provided with terminals $f$ and $f'$, cross-bar $g$, integral with the rod G and pivoted between the guides H, catches J, in combination with the extremity of scale-beam A, cross-bar $a$, and button C, substantially as described.

2. In electric-alarm mechanism for a scale, a scale-beam A, provided with a cross-bar $a$, in combination with guides H, rod G, provided with cross-bar $g$, pivoted in said guides, catches J, push-button C, battery D, and alarm E, substantially as described.

FRANK H. BRIGGS.

Witnesses:
WM. M. MONROE,
F. H. MOORE.